(12) United States Patent
Semple et al.

(10) Patent No.: US 11,674,518 B2
(45) Date of Patent: Jun. 13, 2023

(54) DATA AND POWER CONFIGURATION FOR ELECTRICAL SUBMERSIBLE WELL PUMP

(71) Applicant: Baker Hughes Oilfield Operations LLC, Houston, TX (US)

(72) Inventors: Ryan Semple, Owasso, OK (US); David Tanner, Broken Arrow, OK (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 86 days.

(21) Appl. No.: 17/308,884

(22) Filed: May 5, 2021

(65) Prior Publication Data

US 2021/0381350 A1    Dec. 9, 2021

Related U.S. Application Data

(60) Provisional application No. 63/035,434, filed on Jun. 5, 2020.

(51) Int. Cl.
*F04D 13/10* (2006.01)
*E21B 17/02* (2006.01)
(Continued)

(52) U.S. Cl.
CPC .......... *F04D 13/10* (2013.01); *E21B 17/023* (2013.01); *E21B 43/128* (2013.01);
(Continued)

(58) Field of Classification Search
CPC .... F04D 13/10; F04D 13/062; F04D 13/0693; F04D 13/086; F04D 29/086;
(Continued)

(56) References Cited

U.S. PATENT DOCUMENTS 1,655,824 A * 1/1928 Schmidt ................. H02K 5/132
                                                    310/112
2,002,915 A * 5/1935 Mendenhall ........... H02K 5/132
                                                    277/428
(Continued)

FOREIGN PATENT DOCUMENTS

EP            3320176 B1      5/2018
WO        2015196062 A2     12/2015

OTHER PUBLICATIONS

International Search Report and Written Opinion of PCT Application No. PCT/US2021/070515 dated Aug. 18, 2021: pp. 1-7.

*Primary Examiner* — Charles G Freay
(74) *Attorney, Agent, or Firm* — Bracewell LLP; Keith R. Derrington

(57) ABSTRACT

An electrical submersible well pump (ESP) has a motor electrical connector mounted to an exterior of the motor. A motor sensor connects to an interior side of the motor electrical connector. Seal first and second electrical connectors mount to an exterior of a seal/motor adapter. A seal internal wire within the seal section electrically connects interior sides of the seal first and second electrical connectors together. An external motor jumper wire extends alongside the motor between the motor electrical connector and the seal first electrical connector. A pump electrical connector mounts to an exterior of a pump/seal adapter and connects to a pump sensor within the pump. An external seal jumper wire connects between the seal second electrical connector and the pump electrical connector.

20 Claims, 7 Drawing Sheets

(51) Int. Cl.
*E21B 47/008* (2012.01)
*E21B 43/12* (2006.01)
*F04D 13/06* (2006.01)
*F04D 15/00* (2006.01)
*F04D 29/08* (2006.01)
*F04D 13/08* (2006.01)
*H02K 5/132* (2006.01)

(52) U.S. Cl.
CPC .......... *E21B 47/008* (2020.05); *F04D 13/062* (2013.01); *F04D 13/0693* (2013.01); *F04D 13/086* (2013.01); *F04D 15/0088* (2013.01); *F04D 29/086* (2013.01); *H02K 5/132* (2013.01)

(58) Field of Classification Search
CPC ................ F04D 15/0088; H02K 5/132; E21B 17/023; E21B 43/128; E21B 47/008
See application file for complete search history.

(56) References Cited

U.S. PATENT DOCUMENTS

| | | | |
|---|---|---|---|
| 7,248,178 B2 | 7/2007 | Layton | |
| 7,672,262 B2 | 3/2010 | McCoy et al. | |
| 8,082,217 B2 | 12/2011 | Crossley et al. | |
| 9,441,633 B2 | 9/2016 | Sheth et al. | |
| 9,831,740 B2 | 11/2017 | Lee et al. | |
| 10,164,500 B2 | 12/2018 | Strattan et al. | |
| 11,542,800 B2 * | 1/2023 | Brown | E21B 43/38 |
| 2012/0223603 A1 * | 9/2012 | Knapp | H02K 5/225 310/71 |
| 2014/0159550 A1 * | 6/2014 | O'Bryan | G01M 15/00 310/68 B |
| 2015/0184670 A1 | 7/2015 | Hill et al. | |
| 2018/0328365 A1 * | 11/2018 | Eslinger | F04D 13/10 |
| 2021/0207596 A1 * | 7/2021 | Semple | H02K 11/30 |
| 2021/0288541 A1 * | 9/2021 | Madbouly | H02K 5/132 |

* cited by examiner

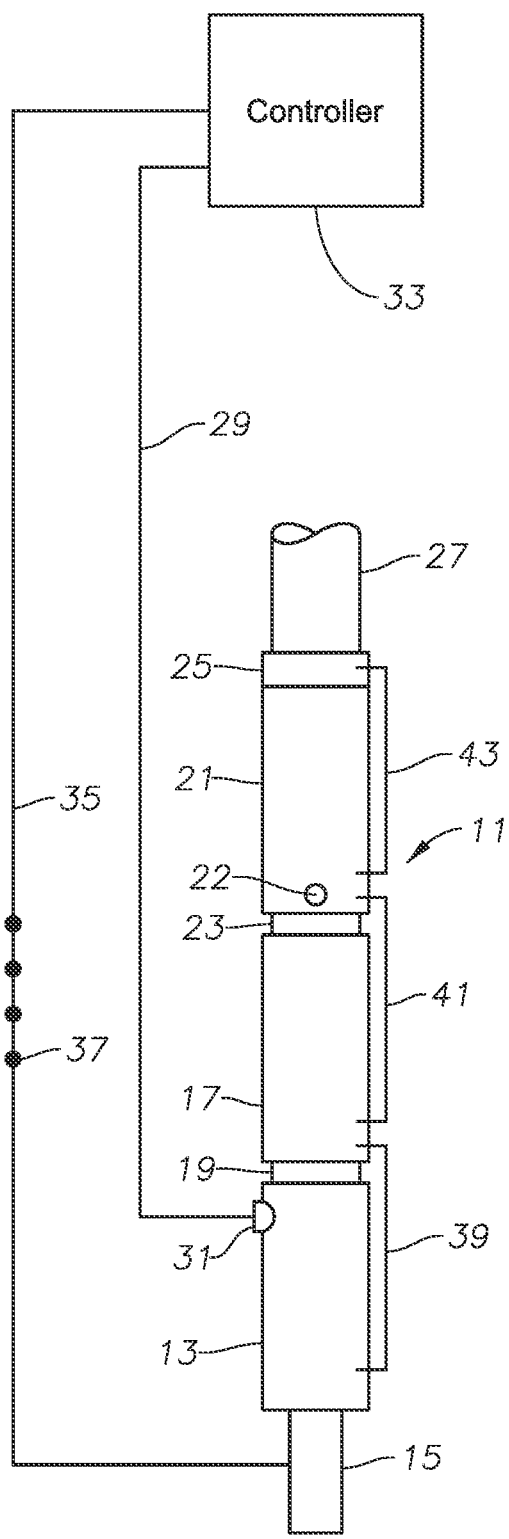
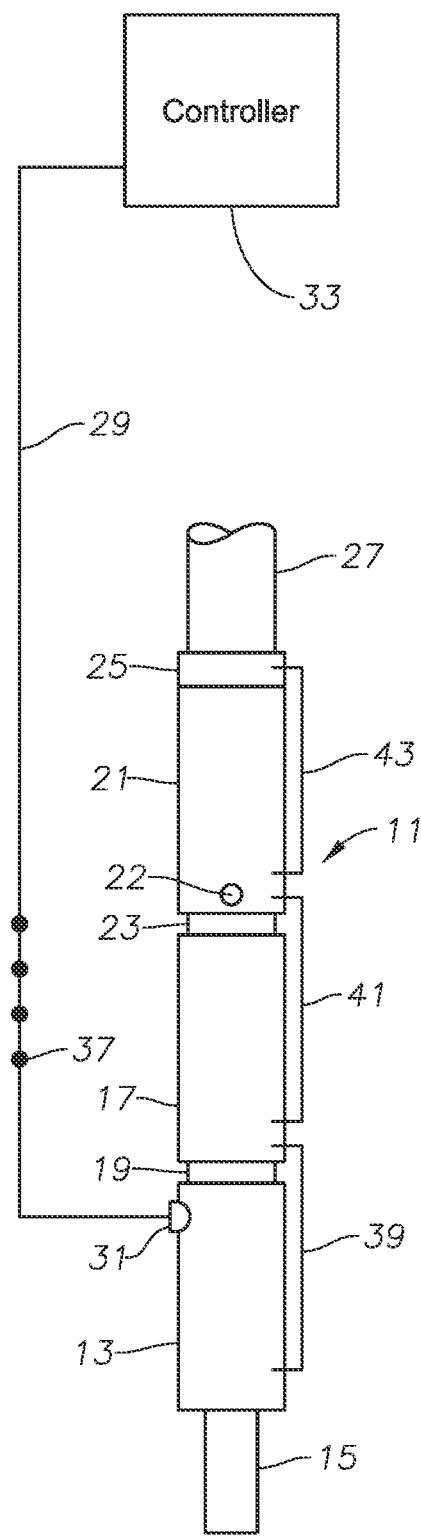
FIG. 1                    FIG. 2

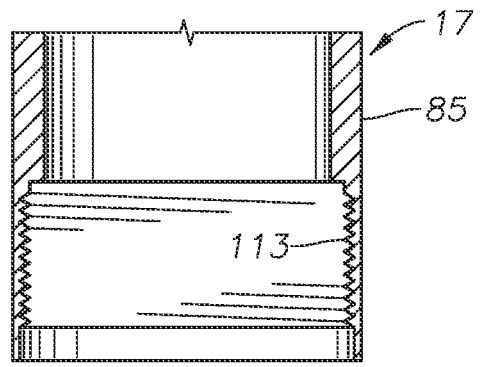
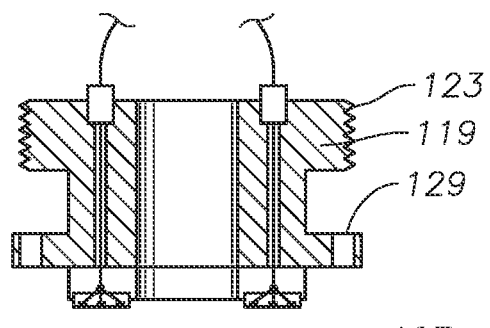
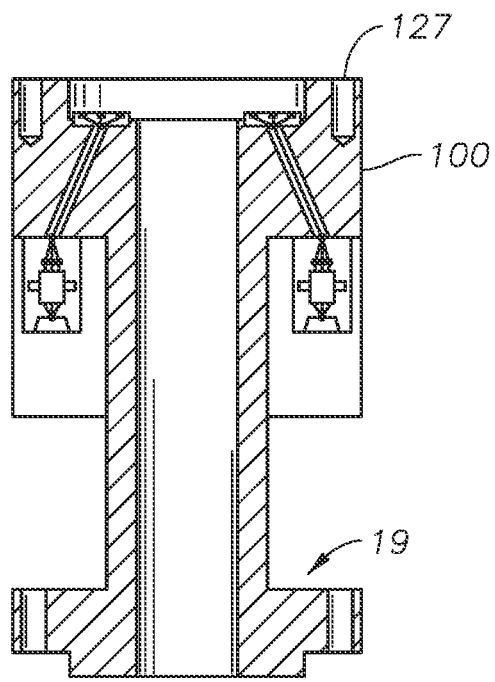
FIG. 9
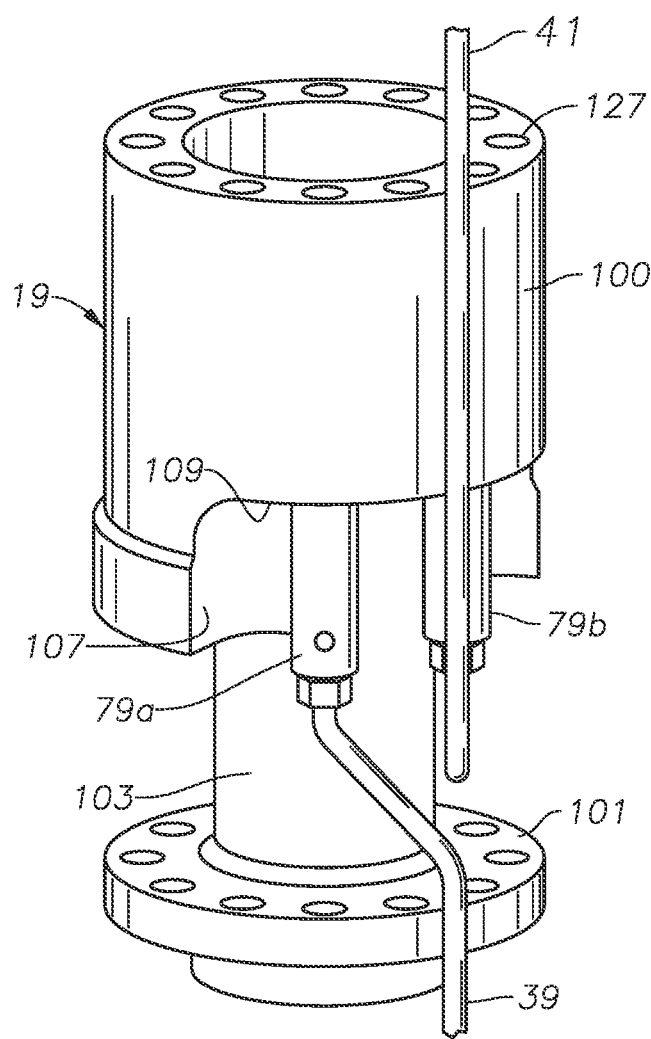
FIG. 10

DATA AND POWER CONFIGURATION FOR ELECTRICAL SUBMERSIBLE WELL PUMP

CROSS-REFERENCE TO RELATED APPLICATION

This application claims priority to provisional application Ser. No. 63/035,434, filed Jun. 5, 2020.

BACKGROUND

Electrical submersible pumps (ESP) are commonly used to pump hydrocarbons from wells. A typical ESP has an electrical motor that drives a pump, which may be a centrifugal pump. A seal section with a pressure equalizer normally connects between the motor and the pump. The seal section seals around the motor shaft and the pressure equalizer is in communication with a dielectric motor lubricant that fills the motor. The pressure equalizer, which may be a bag or bellows, has one side in contact with the motor lubricant and another side exposed to well fluid to reduce a pressure differential between the lubricant and the well fluid. A power cable extends into the well and connects to the motor to provide three-phase power.

ESPs may be equipped with sensors to determine various operational parameters. In one type of system, a gauge unit is at a lower end of the motor. The gauge unit has a pressure sensor and a temperature sensor for monitoring the pressure and temperature of the motor lubricant in the motor. The sensors may be powered and communicate with a controller at the upper end of the well. The power and communication may be accomplished by superimposing power requirements and data on the three conductors of the power cable. Alternately, a dedicated instrument wire may extend from the controller to the gauge unit.

Because of the long length of an ESP, which could exceed 60 feet, the ESP is made up of modules brought separate from each other to the wellsite. For example, the motor connects to the seal section with an adapter, and the seal section connects to the pump with an adapter. Sometimes motors, seal sections and pumps are connected in tandem arrangements with adapters. Because of the separate modules, it is challenging to reliably place sensors or other electronic devices in modules other than the motor and gauge unit module.

SUMMARY

An electrical submersible well pump (ESP) for installation in a well comprises a motor, a seal section and a pump. A motor electrical connector mounts to an exterior of the motor. A motor sensor in an interior of the motor connects to an interior side of the motor electrical connector. A seal/motor adapter on an end of the seal section has a threaded arrangement for connecting the seal section to the motor. Seal first and second electrical connectors mount to an exterior of the seal/motor adapter, each having an exterior side and an interior side. A seal internal wire within the seal section electrically connects the interior sides of the seal first and second electrical connectors together. An external motor jumper wire has one end electrically connected to the exterior side of the motor electrical connector. The motor jumper wire extends alongside the motor and has another end connected to the exterior side of the seal first electrical connector. A pump/seal adapter on an end of the pump has a threaded arrangement for connecting the pump to the seal section. A pump electrical connector having an exterior side and an interior side mounts to an exterior of the pump/seal adapter. A pump sensor within an interior of the pump is electrically connected to the interior side of the pump electrical connector. An external seal jumper wire has one end electrically connected to the exterior side of the seal second electrical connector. The seal jumper wire extends alongside the seal section and has an opposite end connected to the exterior side of the pump electrical connector. The motor sensor and the pump sensor are linked together through the motor jumper wire and the seal section jumper wire.

A controller for placement adjacent a wellhead of a well in which the ESP is installed supplies power to and addresses the motor sensor and the pump sensor.

In one embodiment, a slip ring arrangement located between the seal first and second electrical connectors and the internal wire in the seal section enables the seal/motor adapter to be secured to the seal section by rotation without twisting the seal internal wire.

More specifically, an adapter body configured for connection between the motor and the seal section has two electrical annular contacts mounted to the adapter body. The annular contacts are concentric with a longitudinal axis of the adapter body and one encircles the other. One of the annular contacts is electrically connected with the interior side of the seal first electrical connector. The other of the annular contacts is electrically connected with the interior side of the seal second electrical connector. An insert member has threads that secure by rotation of the insert member to threads within the seal section. Two slip rings are on the insert member, one encircled by the other. Each of the slip rings engages one of the annular contacts when the insert member engages the adapter body. One of the slip rings electrically connects to one end of the internal wire in the seal section. The other of the slip rings electrically connects to the other end of the internal wire.

A power cable extends to the motor from the upper end of a well in which the ESP is installed. The power cable has three power conductors for supplying three phase power to the motor. In one embodiment, at least two supplemental power wires connect to lower ends of the power conductors. A supplemental power supply connects to the supplemental power wires. The supplemental power supply connects to the motor electrical connector. At least one electronic device mounts selectively in the motor, the seal section or the pump for performing a function other than sensing. The supplemental power supply powers the electronic device.

In the example shown, a seal sensor located within the seal section electrically connects into the seal internal wire.

BRIEF DESCRIPTION OF THE DRAWINGS

FIG. 1 is a schematic side view of an ESP in accordance with this disclosure, the assembly including a power cable and a separate instrument line on which data packets are transmitted.

FIG. 2 is a schematic side view of an alternate embodiment of an ESP in which data packets are transmitted on the power cable rather than a separate instrument line.

FIG. 9 is an exploded sectional view of an alternate embodiment of the adapter and slip ring insert of FIG. 8.

FIG. 10 is a perspective view of the body of the adapter of FIG. 9 with the slip ring insert not shown.

Figure 3:
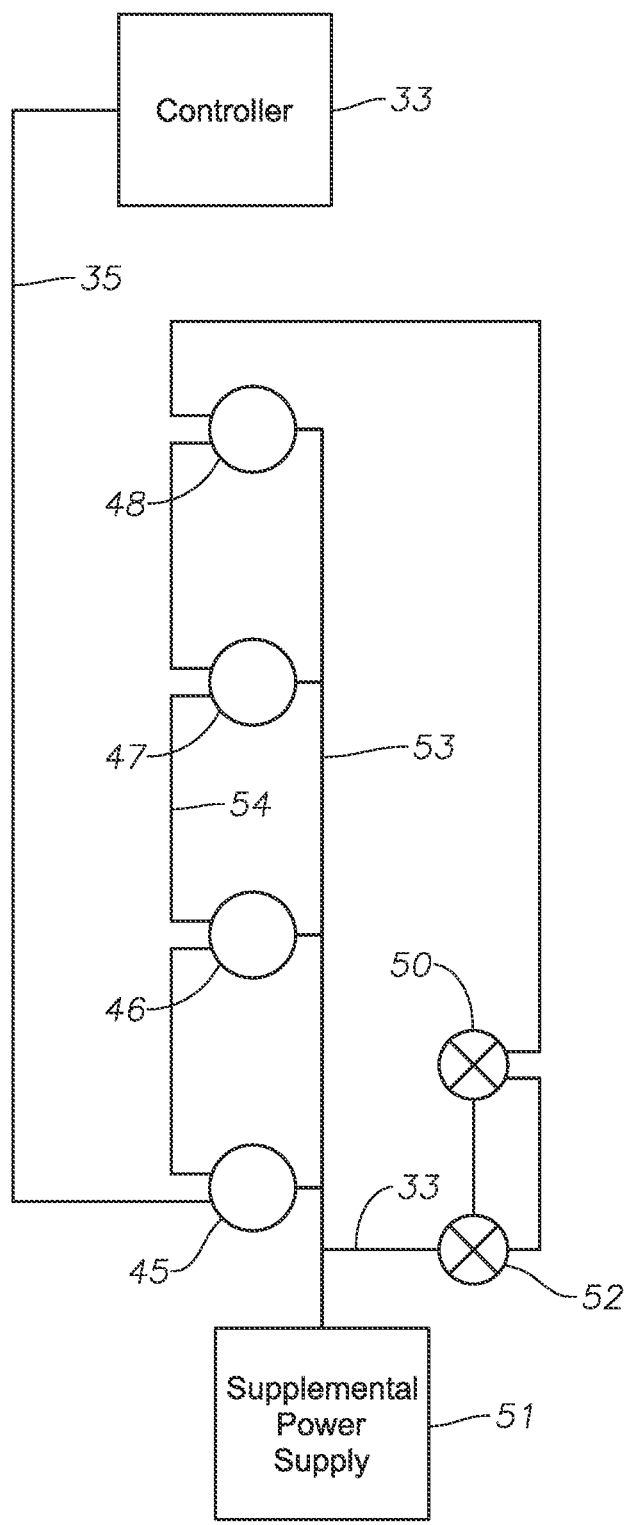
FIG. 3 is an electrical schematic view illustrating sensors and electronic devices installed in the modules of the ESP of FIG. 1.

While the disclosure will be described in connection with the preferred embodiments, it will be understood that it is not intended to limit the disclosure to that embodiment. On the contrary, it is intended to cover all alternatives, modifications, and equivalents, as may be included within the scope of the disclosure as defined by the appended claims.

DETAILED DESCRIPTION OF THE DISCLOSURE

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude. The terms "upper", "lower" and the like are used only for convenience.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Referring to FIG. 1, ESP 11 has a motor 13, normally a three-phase AC motor. In this example, a gauge unit 15 secures to the lower end of motor 13. Gauge unit 15 is adapter that contains electronics for monitoring the health of ESP 11 during operation, and optionally causing certain control functions to be performed. A seal section 17 connects to the upper end of motor 13 with a seal section or seal/motor adapter 19. Seal section 17 seals around the drive shaft assembly of motor 13. Also, seal section 17 may contain a pressure equalizer, such as a bag or bellows to reduce a pressure differential between well fluid on the exterior and the dielectric lubricant that fills motor 13.

A pump 21 with a well fluid intake 22 connects to the upper end of seal section 17 with a pump/seal adapter 23. Pump 21 may be centrifugal pump having a large number of stages, each stage comprising a rotating impeller and a non-rotating diffuser. Alternately, pump 21 could be another type, such as a progressing cavity pump. In this example, pump 21 has a discharge adapter 25 on its upper end that connects to production tubing 27 for discharging well fluid in tubing 27. Instead of production tubing 27, a string of coiled tubing could support ESP 11; in that instance, motor 13 would be on the upper end of ESP 11 and pump 21 on the lower end. Pump 21 would discharge well fluid into an annulus surrounding the coiled tubing.

A power cable 29 extends downward alongside production tubing 27 and has an electrical connector 31 on its lower end that connects to an upper end of motor 13. The upper end of power cable 29 connects to a controller 33 that is adjacent a wellhead of the well. Controller 33 supplies three-phase power to motor 13 via power cable 29. If coiled tubing is employed, power cable 29 would be located in the coiled tubing instead of strapped to the exterior of production tubing 27.

In the example of FIG. 1, a dedicated, separate instrument line 35 extends into the well from controller 33 and connects to gauge unit 15. Instrument line 35 provides the power and communication link for gauge unit 15. Data packets 37 concerning the health of ESP 11 are transmitted over instrument line 35 between controller 33 and gauge unit 15. Each data packet 37 has an address for one of the sensors in ESP 11.

ESP 11 could have other modules in addition to motor 13, seal section 17 and pump 21. For example, there could be tandem motors, tandem seal sections, and tandem pumps connected with adapters. Pump intake 22 could be in a separate module connected to pump 21 with an adapter. Also, a gas separator could be in a separate module mounted to the lower end of pump 21 with an adapter. In that instance, pump intake 22 would be in the gas separator. The various adapters 19, 23 and 25 could be a type that bolts the various modules to each other. Alternately, adapters 19, 23 and 25 could be threaded collar types.

In this embodiment, an external motor jumper wire 39 has a lower end at gauge unit 15 and an upper end at seal section adapter 19. Motor jumper wire 39 extends alongside motor 13 and connects with electronics within gauge unit 15. Similarly, a seal section jumper wire 41 connects to seal section adapter 19 and extends alongside seal section 17 to pump adapter 23. The lower end of seal section jumper wire 41 is electrically connected to the upper end of motor jumper wire 39. In this example, a pump jumper wire 43 has a lower end connected to pump intake adapter 23 and an upper end joining pump discharge adapter 25. Pump jumper wire 43 has a lower end in electrical communication with seal section jumper wire 41 and extends alongside the exterior of pump 21.

Jumper wires 39, 41 and 43 provide a bus for electronics in gauge unit 15 to communicate with and power various sensors mounted in motor 13, gauge unit 15, seal section 17 and pump 21. Jumper wires 39, 41, and 43 are configured to easily connect to adapters 19, 23 and 25 when the various modules are being connected to each other at a well site.

Referring to FIG. 2, ESP 11 is the same as in FIG. 1, except it does not have a dedicated instrument line 35. Instead controller 33 supplies power for gauge unit 15 and the various sensors over the three conductors of power cable 29. Data packets 37 are also communicated between controller and gauge unit 15 over power cable 29.

FIG. 3 is a sensor electrical schematic for exemplary sensors of ESP 11 of FIG. 1, which has dedicated instrument line 35 leading to gauge unit 15. The sensor electrical schematic of ESP 11 of FIG. 2 would appear the same, except for not having dedicated instrument line 35. FIG. 3 illustrates a motor sensor 45 that is either in the interior of motor 13 on in gauge unit 15 but immersed in the motor lubricant that fills motor 13. Motor sensor 45 senses the pressure and temperature of the motor lubricant in motor 13. Motor 13 may have other sensors, such a vibration sensor, a dielectric lubricant sensor that determines any well fluid ingression into the motor lubricant, and a temperature sensor that senses the temperature of the windings in the stator.

One or more seal section sensors 46 may be in the interior of seal section 17 (FIG. 1). Sensor 46, for example, could monitor well fluid encroachment in the motor lubricant within the pressure equalizer of seal section 17. One of more pump sensors 47 may be in the interior of pump 21 (FIG. 1) for monitoring parameters such as well fluid intake pressure. One or more pump discharge sensors 48 may be in pump discharge adapter 25 (FIG. 1) for monitoring well fluid parameters such as discharge pressure. More or fewer sensors may be employed in ESP 11.

Additionally, motor 13, seal section 17 and pump 21 could have electronic devices 50, 52 that perform functions other than monitoring operating conditions. For example, the electronic devices may include solenoids to move a valve or a plug, or the electronic devices may include a cooling device for cooling certain components.

Sensors 45, 46, 47 and 48, and electronic devices 50, 52, if employed, are each connected to a bus 54 in a daisy chain manner. Each sensor 45, 46, 47, and 48 and electronic devices 50, 52 communicate with controller 33 over bus 54. Jumpers 39, 41 and 43, shown in FIG. 1, and instrument line 35, if employed, make up bus 54. Controller 33 may supply power over instrument line 35 and bus 54 to sensors 45, 46, 47 and 48. However, electronic devices 50, 52 may require more power than the power that is available to operate sensors 45, 46, 47, and 48.

An optional supplemental power supply 51 in gauge unit 15 may supply power to electronic devices 50, 52, as well as sensors 45, 46, 47 and 48, over a power line 53. Each sensor 45, 46, 47 and 48, as well as each electronic device 50, 52 has a unique address for communicating with controller 33 over bus 54 and instrument line 35. If an instrument line 35 is not employed, as in ESP 11 in FIG. 2, the communication between controller 33 and the various sensors 45, 46, 47, 48 and electronic devices 50, 52 would be over power cable 29 (FIG. 1).

Figure 5:
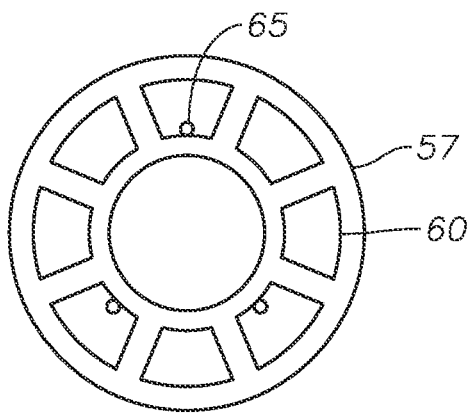
FIG. 5 is a schematic top view of a stator of the motor of the ESP of FIG. 4, illustrating wires extending through the stator to the supplemental power supply.
Figure 4:
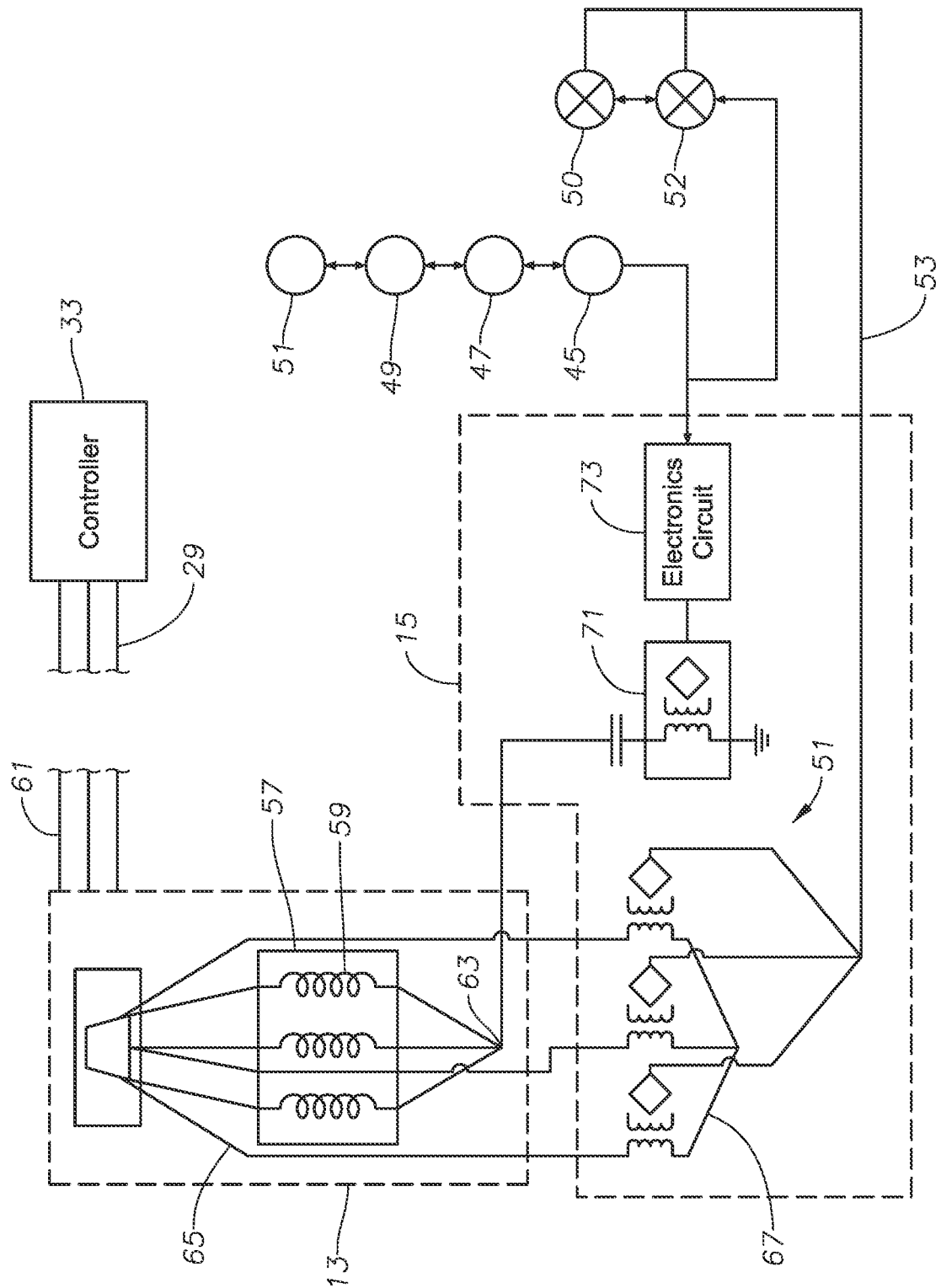
FIG. 4 is another electrical schematic illustrating sensors and electronic devices installed in the modules of the ESP of FIG. 2, and a supplemental power supply.

FIG. 4 illustrates supplemental power supply 51 in more detail. Motor 13 has a stator 57 with motor wires or windings 59 wound through slots 60 (FIG. 5). Power cable 29 has three power cable conductors 61, and each conductor 61 is connected to a different phase of windings 59. Two or more supplemental power supply wires 65 (three shown) extend through stator slots 60 (FIG. 5) alongside and insulated from windings 59 (not shown in FIG. 5). Each supplemental power supply wire 65 has an upper end connected to one of the three power cable conductors 61. Each power supply wire 65 has a lower end connected to a separate bridge rectifier 67. The DC output from the bridge rectifiers 67 joins the auxiliary power supply line 53.

FIG. 4 also illustrates how data is transmitted and power supplied to sensors 45, 46, 47 and 48 when a dedicated instrument line 35 (FIG. 3) is not employed. Windings 59 join each other in a Y-point or junction 63 at the lower end of stator 57. Y-point 63 is at or near a zero voltage for the three phases of windings 59. A line connects Y-point 63 to another bridge rectifier 71. Controller 33 will provide instrument electrical power to power cable conductors 61 that is separated from the main power suppled over conductors 63 to operate motor 13. That instrument power leads from Y-point 63 to bridge rectifier 71, which in turn supplies a DC output to an electronics circuit 73. Electronics circuit 73 provides power to and communication between sensors 45, 46, 47, 48 and controller 33. Electronics circuit 73 receives data packets from sensors 45, 46, 47, 48 and transfers that information to controller 33 over power cable conductors 61.

Figure 6:
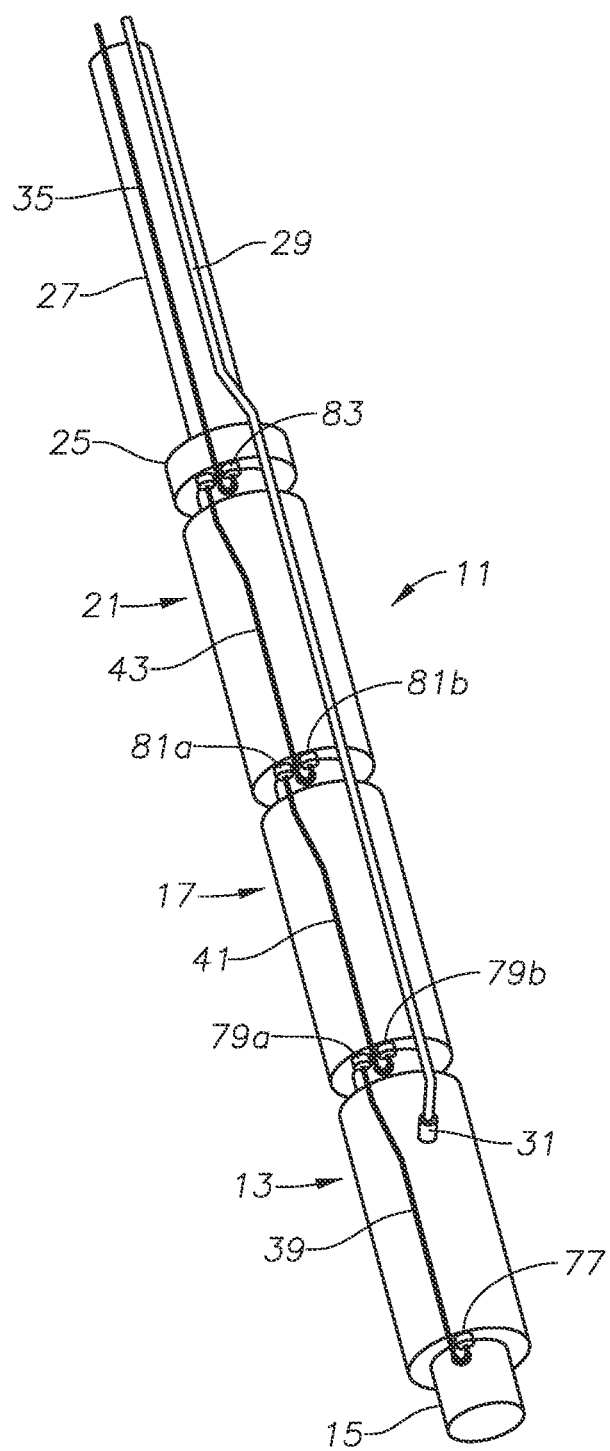
FIG. 6 is an isometric side view of the ESP of FIG. 1.

Referring to FIG. 6, ESP 11 of FIG. 1 has an electrical connector 77 that connects to electronics in gauge unit 15 and optionally to a motor internal sensor 45 (FIG. 3). The lower end of motor jumper wire 39 joins motor electrical connector 77. Motor jumper wire 39 extends along the exterior of motor 13 and joins a seal section electrical connector 79a at seal section adapter 19. Seal section jumper wire 41 joins a seal section electrical connector 79b and extends upward alongside seal section 17 to a pump intake electrical connector 81a on pump intake adapter 23. Pump jumper wire 43 extends upward alongside pump 21 to a pump discharge electrical connector 83 on pump discharge adapter 25. In FIG. 6, dedicated instrument line 35 is illustrated as terminating at pump discharge electrical connector 83 rather than at the bottom of gauge unit 15.

Figure 7:
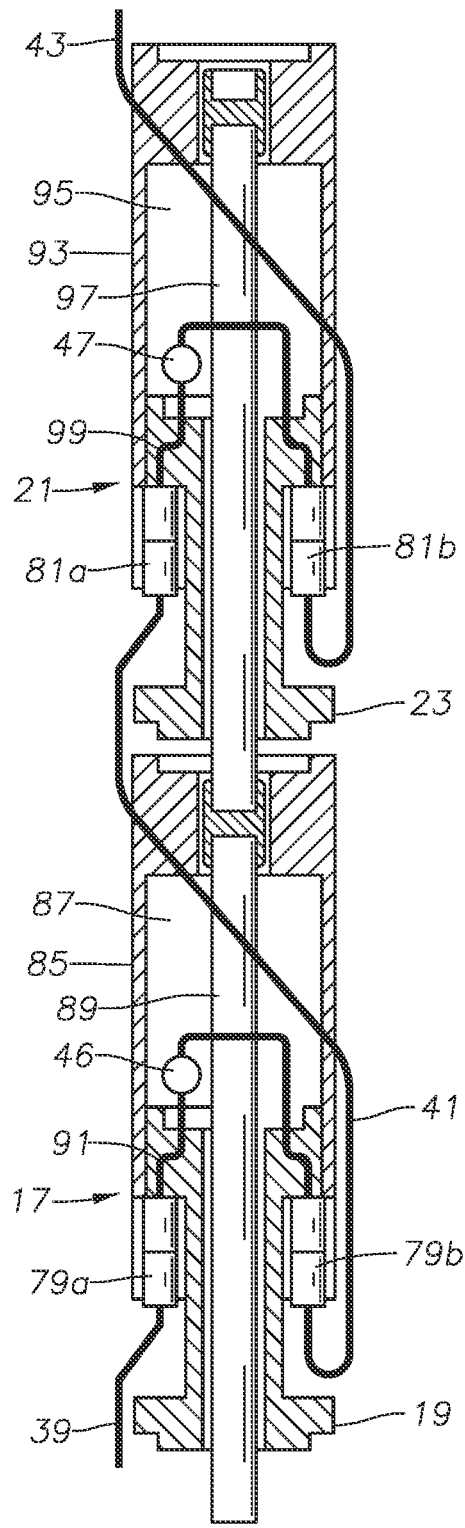
FIG. 7 is a schematic axial sectional view of two of the modules of the ESP of FIG. 6.

FIG. 7 schematically illustrates interior portions of seal section 17 and pump 21. Seal section 17 has a tubular housing 85 with an interior 87 that may contain a pressure equalizer, such as a bag or bellows (not shown). The bag or bellows will have an inner side in fluid communication with dielectric lubricant from motor 13 (FIG. 6) and an outer side exposed to well fluid. Seal section interior 87 may contain other components, such as a thrust bearing. A drive shaft 89 driven by motor 13 extends through seal section adapter 19 and seal section interior 87. Motor jumper wire 39 will be electrically connected to seal section electrical connector 79a when seal section adapter 19 is secured to motor 13. Seal section jumper wire 41 will be electrically connected to seal section electrical connector 79b either before or after motor jumper 39 connects to seal section electrical connector 79a.

A seal section internal wire 91 within seal section interior 87 electrically connects the interior sides of seal section electrical connectors 79a, 79b to each other. Also, if a seal section sensor 46 is employed, it will be connected to seal section interior wire 91.

Pump 21 has a tubular housing 93 with an interior 95 that contains pumping components, such as impellers and diffusers (not shown). A drive shaft 97 driven by seal section shaft 89 extends through pump intake adapter 23 and pump interior 95. The upper end of seal section jumper wire 41 will be electrically connected to electrical connector 81a when seal section 17 is secured to pump intake adapter 23. Pump jumper wire 43 will have a lower end electrically connected to pump electrical connector 81b either before or after seal section jumper 41 connects to pump electrical connector 81a.

A pump internal wire 99 within pump interior 95 electrically connects the interior sides of pump intake connectors 81a, 81b to each other. Also, if a pump sensor 47 is employed, it will be connected to pump interior wire 99.

Figure 8:
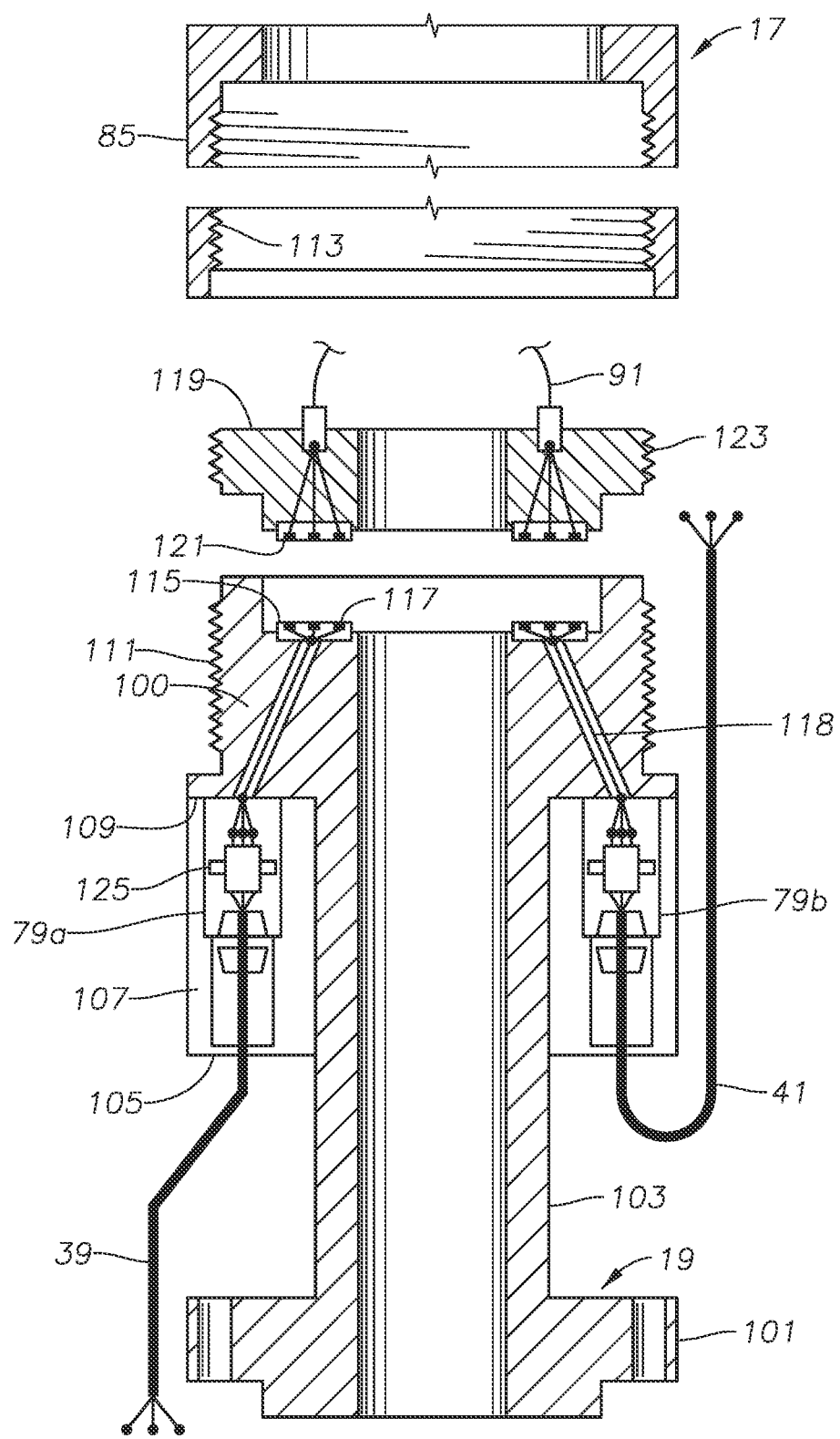
FIG. 8 is an exploded sectional view of an adapter and slip ring insert member for connection between the modules of FIG. 7.

FIG. 8 shows more details of seal section adapter 19; pump intake adapter 23 (FIG. 7) may be identical. Seal section adapter 19 has a tubular body 100 with a threaded arrangement for securing seal section 17 to motor 13 (FIG. 1). In this example, the threaded arrangement includes a bolt hole flange 101 on its lower end for securing threaded bolts (not shown) to the upper end of motor 13 (FIG. 6). Alternately, a rotatable collar could be employed instead of bolts to connect seal section 17 to motor 13. A neck 103 of smaller diameter extends from bolt hole flange 101 to a larger diameter portion of body 100. A neck downward facing shoulder 105 is at an upper end of neck 103. A recess 107 extends partly around the upper portion of body 100. Recess 107 has a recess downward facing shoulder 109 above neck shoulder 105. The larger diameter portion of body 100 has a set of external threads 111 that engage internal threads 113 in seal section housing 85.

A body slip ring 115 is mounted on an upper portion of body 100 coaxial with the bore extending through body 100. Slip ring 115 comprises annular electrical contacts 117 (three shown) facing upward. Annular contacts 117 are concentric with the axis of seal adapter body 100. Electrical leads 118 extend from seal section electrical connectors 79a, 79b through holes in body 100 to separate ones of the annular contacts 117 of slip ring 115.

Seal section adapter 19 has an insert member 119 with a slip ring 121 with annular electrical contacts that mate with annular contacts 117 when seal section adapter 19 secures to seal section housing 85. One of the annular contacts of insert member slip ring 121 is connected to seal section interior wire 91 by an electrical lead extending through holes in insert member 119. The other end of seal section interior wire 91 connects to another of the annular contacts of slip ring 121 with an electrical lead.

Insert member 119 has external threads 123 that mate with seal section housing internal threads 113. The axial dimension of insert member threads 123 is smaller than the axial dimension of seal section housing threads 113, so that after insert member 119 is secured to seal section housing 85, there will be room for adapter body external threads 111 to also engage seal section housing threads 113. In this example, adapter body threads 111 have the same diameter as insert member threads 123. The upper end of adapter body 100 abuts a downward facing shoulder of insert member 119 when both are tightened to seal section housing 85.

Seal section electrical connector 79a includes an electrical feed through 125 that electrically joins the conductor in motor jumper 39 with lead 118 that connects to body slip ring 115. Seal section electrical connector 79b has the same type of feed through 125 for electrically connecting seal section jumper wire 41 with another of the contacts 117 of body slip ring 115.

Seal adapter 19 will normally be installed with seal section housing 85 at a factory or the like, then brought to a well site as a part of seal section 17. When connecting seal section adapter 19 to seal section housing 85, it is not necessary to rotationally orient seal section adapter 19 with seal section housing 85 because of slip rings 115, 121. Motor jumper wire 39 and seal section jumper wire 41 may be connected to seal section electrical connectors 79a, 79b at the well site. Electrical continuity will be established from motor jumper wire 39 to seal section jumper wire 41 via electrical feed through device 125 of electrical connector 79a, one of the leads 118, one of the annular mating contacts of slip rings 115 and 121, internal wire 91, another of the annular contacts of slip rings 115, 121, the other lead 118, the other feed through 125 and electrical connector 79b.

FIG. 9 shows an alternate embodiment for body 100 and insert member 119 of FIG. 8. Insert member 119 in this embodiment has a bolt hole flange 129 that allows it to be bolted to seal section adapter body 100. Adapter body 100 has bolt holes 127 that mate with the holes in flange 129. Adapter body 100 does not have any external threads that engage housing internal threads 113. The external threads 123 on insert member 119 connect adapter body 100 to seal section housing 85 when external threads 123 engage internal threads 113 and when adapter body 100 is bolted to insert member 119. The other components of seal section adapter 19 in FIG. 9 are the same as in FIG. 8.

FIG. 10 illustrates the exterior of adapter body 100 of FIG. 9. Connectors 79a and 79b are located in recess 107 and secured to recess shoulder 109. Recess 107 extends circumferentially less than 180 degrees.

Figure 11:
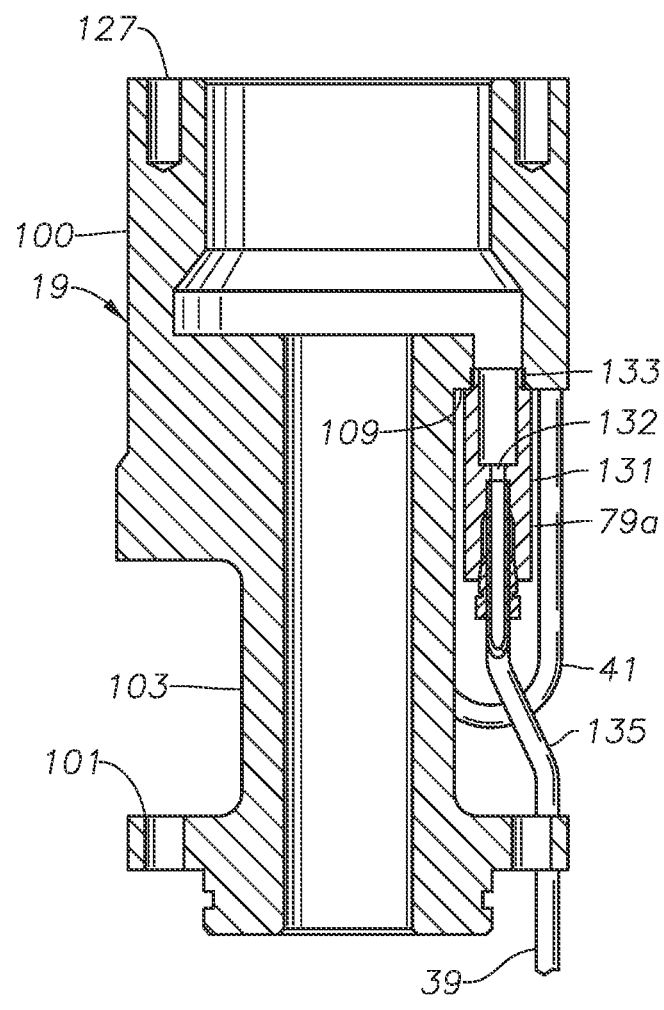
FIG. 11 is an axial sectional view of the adapter body of FIG. 9, showing one of the jumper electrical connectors, and with the slip ring insert not shown.
Figure 12:
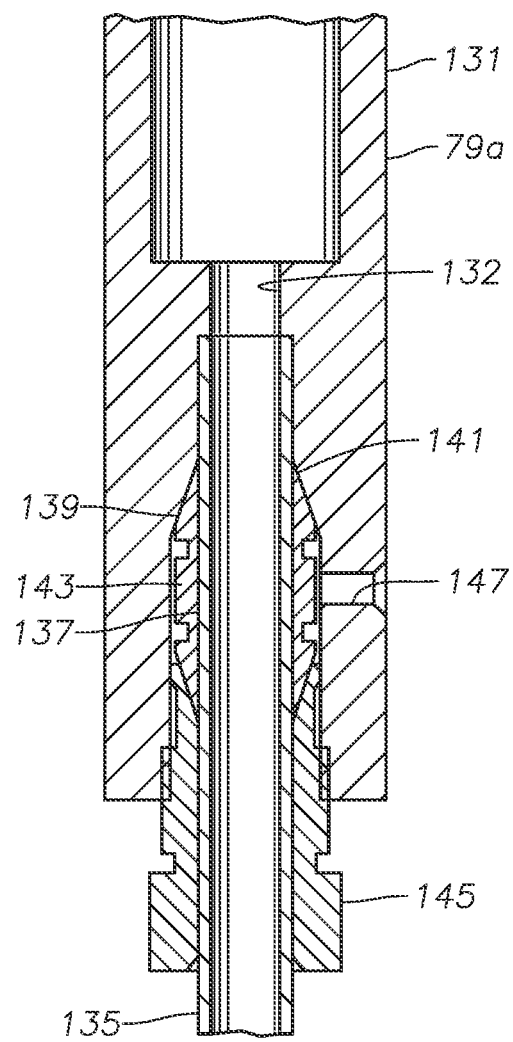
FIG. 12 is an enlarged sectional view of the jumper electrical connector of FIG. 11.

FIGS. 11 and 12 illustrate seal section electrical connector 79a; the other electrical connectors 77, 79b and 81a, 81b (FIG. 6) may be the same. Electrical connector 79a has a metal tubular member 131 with threads 133 on its upper end for connecting to recess shoulder 109 of seal section adapter 19. Tubular member 131 has a bore 132. Motor jumper wire 39, as well as the seal section jumper wire 41 and pump jumper wire 43 (FIG. 6), includes a metal or rigid sheath or tube 135. An insulated wire (not shown) is contained in tube 135.

As shown in FIG. 12, two ferrules 137, 139 receive tube 135 and slide into bore 132 in connector tubular member 131. Ferrules 137, 139 have external conical sealing surfaces 141. The upper ferrule conical surface 141 faces upward and abuts a conical surface in tubular member bore 132. The conical surface on lower ferrule 139 faces downward. A non-sealing spacer 143 locates between ferrules 137, 141.

A compression nut 145 has a conical sealing surface that abuts lower ferrule conical surface 141, and when tightened to tubular member 131, exerts a force through spacer 143 that deforms both ferrules 137, 139, causing them to seal between metal tube 135 and tubular member bore 132. Spacer 143 does not deform or seal. The wire located in metal tube 135 has an electrode on its upper end that electrically engages an electrical contact in feedthrough 125 (FIG. 8) by an upward push the preferred embodiment.

A test port 147 in tubular member 131 leads from bore 132 to the exterior at a point adjacent spacer 143. Applying test pressure to port 147 enables the test pressure to be exerted in opposite directions on the two ferrules 137, 139. If no leakage is noted, a plug may be inserted into test port 147.

The present invention described herein, therefore, is well adapted to carry out the objects and attain the ends and advantages mentioned, as well as others inherent therein. While only a few embodiments of the invention have been given for purposes of disclosure, numerous changes exist in the details of procedures for accomplishing the desired results. These and other similar modifications will readily suggest themselves to those skilled in the art, and are intended to be encompassed by the scope of the claims.

The invention claimed is:

1. An electrical submersible well pump (ESP) for installation in a well, comprising:
   a motor, a seal section and a pump;
   a motor electrical connector mounted to an exterior of the motor;
   a motor sensor in an interior of the motor and connected to an interior side of the motor electrical connector;
   a seal/motor adapter on an end of the seal section, the seal/motor adapter having a threaded arrangement for connecting the seal section to the motor;
   seal first and second electrical connectors mounted to an exterior of the seal/motor adapter, each of the seal first and second electrical connectors having an exterior side and an interior side;
   a seal internal wire within the seal section that electrically connects the interior sides of the seal first and second electrical connectors together;

an external motor jumper wire having one end electrically connected to an exterior side of the motor electrical connector, the motor jumper wire extending alongside the motor and having another end connected to the exterior side of the seal first electrical connector;
a pump/seal adapter on an end of the pump, the pump/seal adapter having a threaded arrangement for connecting the pump to the seal section;
a pump electrical connector mounted to an exterior of the pump/seal adapter, the pump electrical connector having an exterior side and an interior side;
a pump sensor within an interior of the pump and electrically connected to the interior side of the pump electrical connector;
an external seal jumper wire having one end electrically connected to the exterior side of the seal second electrical connector, the seal jumper wire extending alongside the seal section and having an opposite end connected to the exterior side of the pump electrical connector; and wherein
the motor sensor and the pump sensor are linked together through the motor jumper wire and the seal section jumper wire.

2. The ESP according to claim 1, further comprising:
a controller for placement adjacent a wellhead of a well in which the ESP is installed, the controller being electrically connected with the motor sensor and the pump sensor for supplying power to and addressing the motor sensor and the pump sensor.

3. The ESP according to claim 1, further comprising:
a slip ring arrangement located between the seal first and second electrical connectors and the internal wire in the seal section that enables the seal/motor adapter to be secured to the seal section by rotation without twisting the seal internal wire.

4. The ESP according to claim 1, wherein the seal/motor adapter comprises:
an adapter body configured for connection between the motor and the seal section;
first and second electrical annular contacts mounted to the adapter body, the first and second annular contacts being concentric with a longitudinal axis of the adapter body and one encircled by the other, one of the first and second annular contacts being electrically connected with the interior side of the seal first electrical connector, and the other of the first and second annular contacts being electrically connected with the interior side of the seal second electrical connector;
an insert member that engages the adapter body and has threads that secure by rotation of the insert member to threads within the seal section; and
third and fourth annular contacts on the insert member, one encircled by the other, each of the third and fourth annular contacts engaging one of the first and second annular contacts when the insert member engages the adapter body, one of the third and fourth annular contacts being electrically connected to one end of the internal wire in the seal section, and the other of the third and fourth annular contacts being electrically connected to the other end of the internal wire in the seal section.

5. The ESP according to claim 1, further comprising:
a power cable extending to the motor from an upper end of a well in which the ESP is installed, the power cable having three power conductors for supplying three phase power to the motor;
at least two supplemental power wires connected to lower ends of the power conductors;
a supplemental power supply connected to the supplemental power wires; and
at least one electronic device mounted in either the motor, the seal section or the pump for performing a function other than sensing, the electronic device being powered by the supplemental power supply.

6. The ESP according to claim 1, further comprising:
a seal sensor electrically connected into the seal internal wire and located within the seal section.

7. An electrical submersible well pump (ESP) for installation in a well, comprising:
a motor, a seal section and a pump;
a motor adapter on a lower end of the motor;
a motor electrical connector mounted to an exterior of the motor adapter;
a motor sensor in an interior of the motor and connected to an interior side of the motor electrical connector;
a seal/motor adapter on an end of the seal section for connecting the seal section to the motor;
seal first and second electrical connectors mounted to an exterior of the seal/motor adapter, each of the seal first and second electrical connectors having an exterior side and an interior side;
a seal internal wire within the seal section that electrically connects the interior sides of the seal first and second seal electrical connectors together;
a seal sensor electrically connected into the seal internal wire;
an external motor jumper wire having one end electrically connected to the exterior side of the motor electrical connector, the motor jumper wire extending alongside the motor and having another end connected to the exterior side of the seal first electrical connector;
a pump/seal adapter on an intake end of the pump for connecting the pump to the seal section;
pump intake first and second electrical connectors mounted to an exterior of the pump/seal adapter, each of the pump intake electrical connectors having an exterior side and an interior side;
a pump intake internal wire within an interior of the pump and electrically connected between the pump intake first and second electrical connectors;
a pump intake sensor within an interior of the pump and electrically connected into the pump intake internal wire;
a pump discharge adapter at an upper end of the pump for connecting the pump to production tubing;
a pump discharge electrical connector mounted to the pump discharge adapter, the pump discharge electrical connector having an exterior side and an interior side;
a pump discharge sensor connected to the interior side of the pump discharge electrical connector;
an external pump jumper wire having one end electrically connected to the exterior side of the pump intake second electrical connector, the pump jumper wire extending alongside the pump and having an opposite end connected to the exterior side of the pump discharge electrical connector;
a controller for placement at an upper end of a well in which the ESP is installed; and wherein
the motor sensor and the pump intake and discharge sensors are electrically linked together and to the controller via the motor jumper wire, the seal section jumper wire, and the pump jumper wire.

8. The ESP according to claim 7, further comprising:
a slip ring arrangement located between the seal first and second electrical connectors and the seal interior wire that enables the seal/motor adapter to be secured to the seal section by rotation without twisting the seal internal wire.

9. The ESP according to claim 7, wherein the seal/motor adapter comprises:
an adapter body configured for connection between the motor and the seal section;
a plurality of electrical annular contacts mounted to one end of the adapter body to define adaptor body annular contacts, the adaptor body annular contacts being concentric with a longitudinal axis of the adapter body, one of the annular contacts being electrically connected with the interior side of the seal first electrical connector, and another of the adapter body annular contacts being electrically connected with the interior side of the seal second electrical connector;
an insert member having threads that secure by rotation of the insert member to threads within the seal section; and
a plurality of insert member annular contacts on one side of the insert member that engage the adapter body annular contacts when the adapter body is secured to the seal section, one of the insert member annular contacts being electrically connected to one end of the internal wire in the seal section, and the other of the insert member annular contacts being electrically connected to the other end of the internal wire in the seal section.

10. The ESP according to claim 7, further comprising:
a power cable extending from the upper end of a well containing the ESP to the motor, the power cable having three power conductors for supplying three phase power to the motor;
at least two supplemental power wires connected to lower ends of the power conductors and extending through the motor to the motor adapter;
a supplemental power supply connected to the supplemental power wires;
the supplemental power supply being connected to the motor electrical connector; and
at least one electronic device mounted in either the motor, the seal section or the pump for performing a function other than sensing, the electronic device being powered by the supplemental power supply.

11. The ESP according to claim 7, further comprising:
a seal sensor electrically connected into the seal internal wire and located within the seal section.

12. An electrical submersible well pump (ESP) for installation in a well, comprising:
a motor, a seal section and a pump;
a gauge unit coupled to the motor and having at least one motor sensor for monitoring a parameter of the motor;
a seal/motor adapter that connects the motor to the seal section;
first and second electrical connectors mounted to an exterior of the seal/motor adapter, each of the first and second electrical connectors having an exterior side and an interior side;
an external motor jumper wire having one end electrically connected to the gauge unit, the motor jumper wire extending alongside the motor and having an opposite end connected to the exterior side of the first electrical connector;
a seal internal wire internal within the seal section and connected between the internal sides of the first and second electrical connectors;
a seal sensor electrically connected with the seal internal wire;
a pump assembly intake adapter that connects the seal section to the pump assembly;
third and fourth electrical connectors mounted to an exterior of the pump assembly intake adapter, the third and fourth electrical connectors each having an exterior side and an interior side;
an external seal jumper wire having one end connected to the exterior side of the second electrical connector, the seal jumper wire extending alongside the seal section and having an opposite end connected to the exterior side of the third electrical connector;
a pump assembly internal wire internal within the pump assembly and connected between the third and fourth electrical connectors;
a pump intake sensor electrically connected to the pump assembly internal wire for monitoring a parameter of the well fluid flowing into the pump assembly;
an external pump jumper wire having one end connected to the exterior side of the fourth electrical connector and extending alongside the pump assembly to a pump head;
a pump discharge sensor mounted to the pump head for monitoring a parameter of the well fluid being discharged by the pump assembly; and wherein
the motor sensor, seal sensor, pump intake sensor and pump discharge sensor are linked together in a daisy chain via the motor jumper wire, the seal jumper wire and the pump jumper wire.

13. The ESP according to claim 12, wherein the seal/motor adapter comprises:
a body having a central bore with a longitudinal axis, the body having a motor end that secures to the motor and a seal end that secures to the seal section, the first and second electrical connectors being secured to the body;
a body slip ring mounted in the central bore, the body slip ring having a first contact ring electrically connected with the first electrical connector and a second contact ring electrically connected with the second electrical connector;
an insert member secured to the seal section;
an insert member slip ring secured to the insert member, the insert member slip ring having a first contact ring electrically connected with one end of the seal internal wire and a second contact ring electrically connected with the opposite end of the seal internal wire, the insert member slip ring being inserted into the central bore of the body into contact with the body slip ring; and
a fastener that secures the insert member to the seal section.

14. The ESP according to claim 13, wherein:
the seal section has a housing with internal threads; and
the fastener comprises external threads on the insert member that secure to the internal threads.

15. The ESP according to claim 14, wherein:
the body has external threads that also engage the internal threads to secure the body to the seal section.

16. The ESP according to claim 12, wherein:
the motor jumper wire comprises a rigid tube containing the motor jumper wire; and the first electrical connector comprises:
a tubular member having a passage into which the rigid tube is inserted;

two ferrules in the passage surrounding the rigid tube;
a compression nut that secures to the tubular member and deforms the ferrules into sealing engagement with the rigid tube and the passage; and
a test port extending from the passage through the tubular member to an exterior of the tubular member for enabling test pressure to be applied between the two ferrules.

17. The ESP according to claim 12, further comprising:
an electronics circuit in the gauge unit electrically connected to the motor jumper wire for powering and receiving data from the motor sensor, the seal section sensor and the pump intake and discharge sensors; and
a controller at an upper end of a well containing the ESP that is electrically connected with the electronics circuit.

18. The ESP according to claim 12, wherein:
the motor has a stator with winding slots containing motor wires;
a power cable extends from an upper end of the well to the motor, the power cable having three power conductors for supplying three phase power to the motor wires; and wherein the ESP further comprises:
at least two supplemental power wires connected to at least two of the power conductors and extending through the slots into the gauge unit;
a supplemental power supply in the gauge unit connected to the supplemental power wires;
the supplemental power supply being connected to the motor jumper wire; and
at least one electronic device mounted in either the motor, the seal section or the pump for performing a function other than sensing, the electronic device being powered by the supplemental power supply.

19. The ESP according to claim 12, further comprising:
a controller at an upper end of a well containing the ESP; and
a dedicated instrument line extending from the controller to the pump discharge sensor for communicating data packets to and from the pump discharge sensor, the pump intake sensor, the seal section sensor, and the motor sensor.

20. The ESP according to claim 12, further comprising:
a controller at an upper end of a well containing the ESP;
a stator in the motor with winding slots containing motor wires;
a power cable extending from the upper end of the well to the motor, the power cable having three power conductors for supplying three phase power to the motor wires, the motor wires being electrically connected together at a Y-point; and wherein the ESP further comprises:
an electronics circuit in the gauge unit electrically connected with the Y-point for receiving power from the Y-point and the controller, the electronics circuit being electrically connected with the motor jumper wire for electrically communicating with the motor sensor, the seal section sensor, the pump intake sensor and the pump discharge sensor.

* * * * *

UNITED STATES PATENT AND TRADEMARK OFFICE
CERTIFICATE OF CORRECTION

PATENT NO. : 11,674,518 B2
APPLICATION NO. : 17/308884
DATED : June 13, 2023
INVENTOR(S) : Semple et al.

Page 1 of 1

It is certified that error appears in the above-identified patent and that said Letters Patent is hereby corrected as shown below:

In the Claims

In Column 11, Claim 9, Lines 12 - 15 should read:
-- end of the adapter body to define adapter body annular
contacts, the adapter body annular contacts being con-
centric with a longitudinal axis of the body, one
of the adapter body annular contacts being electrically connected --

Signed and Sealed this
Twenty-fifth Day of July, 2023

Katherine Kelly Vidal
*Director of the United States Patent and Trademark Office*